Dec. 16, 1930.  K. F. R. VON DIERSBURG  1,785,465
MOVING LAMP FOR SIGNS AND ADVERTISEMENTS
Filed July 17, 1928
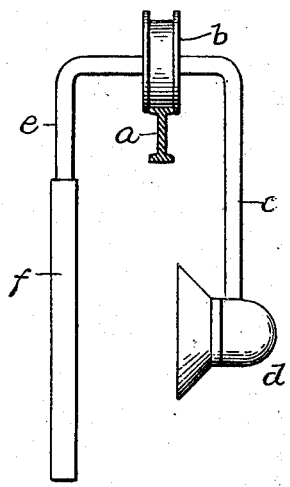
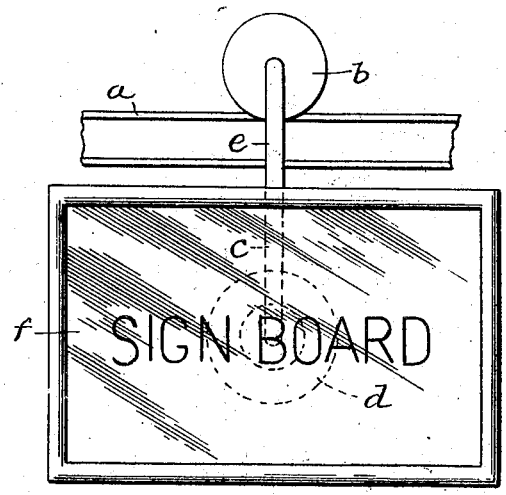
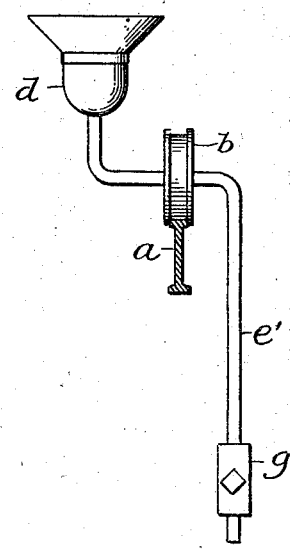
Inventor:
Karl F. R. Von Diersburg,
By Paul E. Schilling
Attorney Patented Dec. 16, 1930

1,785,465

UNITED STATES PATENT OFFICE

KARL FREIHERR ROEDER von DIERSBURG, OF GRAEFELFING, NEAR MUNICH, GERMANY

MOVING LAMP FOR SIGNS AND ADVERTISEMENTS

Application filed July 17, 1928, Serial No. 293,413, and in Germany January 15, 1928.

This invention relates to a device for effective signaling or advertising, and has for its object the provision of a lamp which is supported by means of a roller on a guide-rail so that it can travel along the latter to direct the rays from the lamp in the direction desired along a desired travel course.

Fig. 1 of the accompanying drawings represents a side elevation of the device in connection with an advertising sign.

Fig. 2 is a front elevation of the same.

Fig. 3 shows in side elevation a modified construction of the lamp and its supporting means.

According to the invention a lamp $d$ is carried, through the medium of a bracket or hanger arm $c$, by a roller $b$ journaled on an axis at right angles to and integral with said bracket arm and which is adapted to travel on a rail $a$. The movement is effected either manually or mechanically by means of cords and sheaves or the like and may either be continuous or intermittent.

The lamp may be employed for illuminating a sign $f$ which is connected by means of an arm $e$ to the axis of the roller $b$ so as to act also as a counterbalance for the lamp and travel together with it. As an alternative the lamp may be used for illuminating a stationary sign or a street, a court yard, a floor or the like, in which case the lamp may be balanced by means of a weight $g$ carried by an arm $e'$, as shown in Fig. 3, the lamp being held in an upwardly directed position, as shown, or in any desired inclined position.

With the lamp held in upwardly directed position, the device is particularly suitable for indicating the boundaries of a landing ground for airplanes and the like. Lamps of different colors may be used, and the movement may be utilized for indicating the direction of the flight or of the wind.

Having thus described my invention, I claim:—

1. In an advertising or signal device, a track, a bracket having an axle portion, a roller carried by the axle portion and mounted to travel on the track, a lamp carried by the bracket and arranged at one side of the vertical plane of the roller, an arm depending from the axle portion, and a counterbalance for the lamp carried by said arm and arranged therewith on the opposite side of the vertical plane of the bracket.

2. In an advertising or signal device, a track, a bracket having an axle portion, a roller carried by the axle portion and mounted to travel on the track, a lamp carried by the bracket and arranged at one side of the vertical plane of the roller, an arm depending from the axle portion, and a counterbalance for the lamp carried by said arm and comprising a display element on which the light from the lamp shines, said element being mounted on said arm and arranged therewith on the opposite side of the vertical plane of the bracket.

In testimony whereof I have affixed my signature.

KARL FREIHERR ROEDER von DIERSBURG.